Aug. 27, 1957   C. I. PENN   2,804,589
CONTROL FOR DYNAMOELECTRIC MACHINE
Filed July 20, 1954
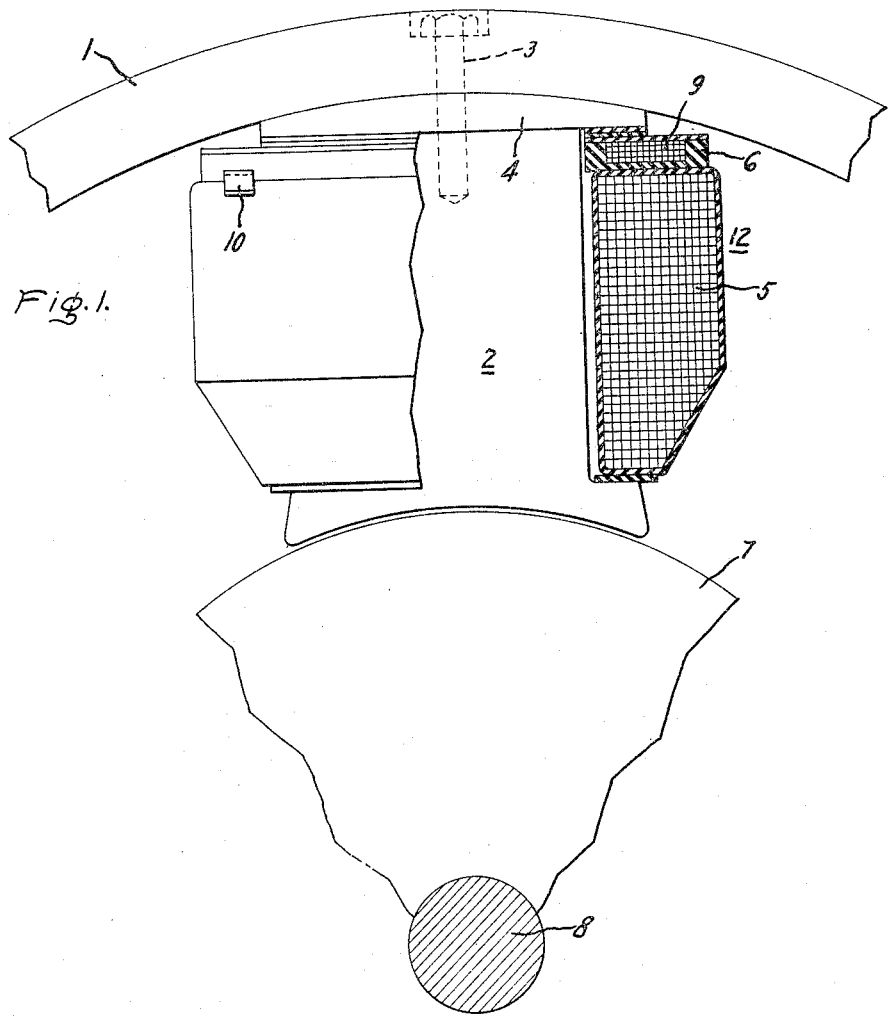
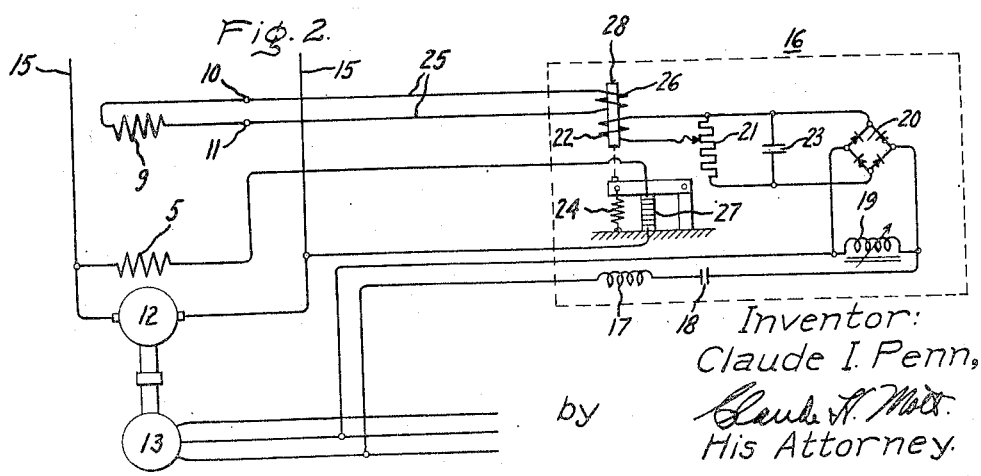
Inventor:
Claude I. Penn,
by Claude N. Mott
His Attorney.

United States Patent Office 2,804,589
Patented Aug. 27, 1957

2,804,589

CONTROL FOR DYNAMOELECTRIC MACHINE

Claude I. Penn, Fort Wayne, Ind., assignor to General Electric Company, a corporation of New York Application July 20, 1954, Serial No. 444,506

7 Claims. (Cl. 322—19)

The present invention relates to the control of the output of dynamoelectric machines and has particular reference to a direct and simple manner of reflecting the rate of change of the excitation flux on the field excitation of a direct current dynamoelectric machine.

In many applications it is necessary to depend upon a variable source of D. C. power, for example, from a marine prime mover or from batteries which become discharged as a primary source of power. It has long been known that a D. C. voltage may be changed to A. C. by the use of a motor-generator set and many arrangements have been used in the past for controlling the output frequency of such sets. Where the A. C. output frequency must be maintained within very close limits because of the requirements of the load being supplied, a control system which is fast-acting in the control of the D. C. motor field and has high amplification is essential. Since the inductance of the excitation winding tends to prevent rapid changes in its current, the instantaneous flux produced by the field current is not normally accurately reflected in the control of the excitation winding and when combined with the inductance of the excitation winding of the D. C. motor, a fast-acting, high amplifying control system may result in hunting and instability. This invention relates to a solution to this problem.

An object of this invention is the provision for sensing instantaneous variations in the excitation flux.

A further object of this invention lies in the provision of means for instantaneously producing a voltage proportional to the rate of change of flux in the magnetic circuit of a dynamoelectric machine.

A still further object of this invention is the provision of an improved control system for a dynamoelectric machine utilizing flux changes detected in the magnetic circuit for controlling the output of the machine within very close limits.

Another object of this invention is the provision of the shock resistant flux sensing coil construction for a dynamoelectric machine which is simple in design and easy to manufacture and maintain.

Further objects and advantages of this invention will become apparent and this invention will be better understood from the following description referring to the accompanying drawing, and the features of novelty which characterize this invention will be pointed out with particularity in the claims annexed to and forming part of this specification.

In the drawing, Fig. 1 is a fragmentary representation of a dynamoelectric machine illustrating the application of the flux sensing coil of this invention.

Fig. 2 is a schematic circuit diagram to illustrate the operation of the improved control arrangement of this invention.

Briefly stated, there is provided in accordance with this invention a combined coil and collar construction wherein an insulating collar, which prevents current leakage from the exciting coil to ground, incorporates a shock-resistant, multi-turn coil which is independent of the current flowing in the excitation field winding and which produces at its terminals a voltage instantaneously proportional to the rate of change of flux in the magnetic core about which it is placed. Because this coil is substantially independent of the inductive reactance of the excitation winding, the voltage at its terminals is substantially in phase with the fluctuations of the flux in the magnetic circuit of the machine. By impressing this voltage upon a voltage or speed regulator, such as upon a control field of an amplidyne generator providing current for the main exciting winding of the controlled machine, or upon a static regulator, a feedback arrangement is provided which serves to stabilize the regulator within very close limits.

Referring now to Fig. 1, there is shown a dynamoelectric machine 12 such as, for example, a D. C. motor having a magnetic frame 1 and a salient pole 2 comprising a core formed of magnetic material secured at its outer end to frame 1 by any suitable means such as bolt 3. To rigidly secure and positively position pole 2 to the frame 1, a pole cap 4 is shown as being provided therebetween. Surrounding the pole 2 is an exciting winding 5 which upon energization produces the field excitation for the machine. In order to protect winding 5 and to provide a sufficient creepage path to ground, an insulating collar 6 is positioned therebetween.

The dynamoelectric machine is also provided with a rotor 7 of any suitable type and is shown in Fig. 1 in phantom and as being mounted for rotation on shaft 8.

In order to detect the instantaneous flux variations of the excitation flux passing through pole 2, for purposes hereinafter more fully described, a multi-turn coil 9 is arranged about the pole in inductive relationship therewith. Since the coil 9 must normally be made up of a plurality of turns to accomplish its intended purpose, it is desirable, because of space considerations, to utilize wire having a diameter as small as possible, say, in the order of .006 of an inch. Such wire, unless properly protected, is susceptible to damage or breakage during assembly or operation of the unit, especially under high shock conditions. In order to provide this protection, the collar 6 is made in the form of a hollow annular collar into which the coil 9 is placed and sealed. In order to prevent the relative movement of the turns of the coil and to provide an arrangement wherein each of the very fine wires of the coil reinforce each other, the coil 9 is preferably filled with a suitable resin base material to form a unitary structure. To provide an easy arrangement for replacing the coil in the event of damage, the pole 2 may be detached at its outer end by the removal of bolt 3 which secures the pole to the frame 1. The combined coil and collar arrangement may then be removed over the end of the pole 2. Such a collar arrangement retains the function of the collar 6 in preventing current discharge to ground and provides for the easy replacement of the coil 9 from the machine.

As shown in Fig. 2, the terminals 10 and 11 of this coil are not connected in the circuit providing the excitation current passing through field winding 5. By this arrangement the inductive reactance of winding 5 does not materially change the time-phase relationship between flux changes in pole 2 and the induced voltage on the terminals 10 and 11 of coil 9. Thus by making coil 9 independent of the field excitation current, a signal instantaneously proportional to the rate of flux in pole 2 is provided.

Turning now to the control system illustrated in Fig. 2, which is shown as being a motor-generator set comprising a D. C. unit 12 mechanically coupled to an A. C. unit 13, here shown as being three-phase, and while this invention is being specifically described in connection with the obtaining of an A. C. source of power having a very closely regulated frequency, it is apparent that it could also be utilized in the obtaining of a very closely regulated D. C. voltage with unit 12 operating as a generator and unit 13 operating as a motor. With the D. C. dynamoelectric machine 12 operating as a motor for driving machine 13 as a generator to provide a constant frequency A. C. output, the speed of motor 12 must remain constant. In order to maintain the speed of the motor 12 constant, a regulator 16 such as, for example, a static regulator, is provided to control the energizing current through a field excitation winding 5. Upon a decrease in the D. C. supply voltage 15, the regulator 16 will compensate to maintain the speed of the D. C. motor 12 at a constant value. However, where the regulator 16 has high amplification and is fast-acting, such a speed control arrangement has a tendency to be unstable if it is sufficiently sensitive to retain the speed of the generator 13 within very close limits, as, for example, 1 cycle per second, due to overcorrection of the flux level resulting from the time constant of winding 5. In order to stabilize the regulator circuit, the voltage across the terminals 10 and 11 of flux sensing coil 9 is impressed upon the regulator so as to reduce the magnitude of the correcting signal of the regulator in proportion to the difference between the instantaneous A. C. frequency and the desired frequency.

A regulating system of the type which is contemplated by this invention is disclosed and claimed in U. S. Patent 2,588,319, dated March 4, 1952, granted to Alec Fisher and assigned to the assignee of the present invention. In this Fisher patent, means for varying the excitation of main winding 5 of the motor responsive to the frequency of the output of alternator 13 is provided and comprises a tuned circuit utilizing well-known resonant circuit principles, and comprises a series connected reactor 17 and a capacitor 18 as well as an adjustable reactor 19 connected with the tuned circuit responsive load comprising a full wave rectifier 20, potentiometer 21 and solenoid coil 22. If desired, a smoothing capacitor 23 may be placed across the rectifier output terminals. The output of the rectifier controls the energization of solenoid coil 22 of a mechanical rectifier which is shown as comprising a carbon pile 27 adapted to be compressed by spring 24 biased against the effect of solenoid coil 22 so that the carbon pile will be spread (or decompressed) when coil 22 is excited. The carbon pile will be compressed (to lower the effective resistance of the regulator) when coil 22 is unexcited. By proper selection of the components of the regulator, the voltage impressed across coil 22 is proportional to the frequency (within the limits of normal operation) of the output of the alternator, and through the control of the resistance of the carbon pile 27, the field excitation of winding 5 is controlled and the speed of the motor 12 is maintained constant.

Because of an inherent slowness in response of the excitation winding of certain dynamoelectric machines due to their inductance, a high amplitude, high speed regulator including a tuned circuit may tend to overcorrect for any deviations in the output frequency. According to the present invention, means are provided for increasing the stability of the circuit. As explained above, the coil 9 has induced between its terminals a voltage proportional to the rate of change of flux to the pole 2. Coil 9 is connected through leads 25 to a solenoid coil 26 to control the energization thereof in opposition to the effect of coil 22. Since the armature 28 of the solenoid is mechanically connected to change the compression on carbon pile 27, and since its energization is effective in proportion to the rate of change of flux in the pole 2, the stability of the circuit is improved and the hunting of the motor speed is substantially eliminated.

In operation, the speed of the motor 12 tends to decrease upon a decrease in its supply voltage, but the regulator 16 serves to keep the speed constant. If the regulation needed is in a direction to decrease the voltage across winding 5, coil 22 pulls the armature of solenoid 28 against the bias of spring 24 to increase the resistance of carbon pile 27. After a delay due to the time constant of winding 5, the changing flux in core 2 induces a voltage in coil 9 which, through solenoid coil 26, opposes the coil 22 to modify the voltage impressed on winding 5 through regulator 16 so that the current in winding 5 approaches a value to provide the pre-selected output frequency of the alternator at a rate proportional to its deviation from the pre-selected frequency. In a like manner, if the regulation needed is in the direction of increasing the voltage across winding 5, the flux change in the pole 2 will induce a voltage in coil 9 in the opposite direction to again modify the correcting voltage across winding 5 proportional to the deviation from the pre-selected frequency.

Regulator 16 has been shown as a static regulator, but it is apparent that it could be another type of regulator, such as an amplidyne generator in which the voltage across the terminals of flux sensing coil 9 is impressed upon a winding on a control axis of the amplidyne generator.

From the foregoing it is apparent that this invention provides a very simple and compact arrangement for detecting the instantaneous variations of the flux in the magnetic circuit of a dynamoelectric machine and to utilize a signal resulting from such variations to aid in stabilizing the output of a machine within very close limits.

While there is illustrated and described particular embodiments of this invention, further modifications and improvements thereof will occur to those skilled in the art. It is to be understood, therefore, that this invention is not limited to the particular forms shown, and it is intended in the appended claims to cover all modifications which do not depart from the spirit and scope of this invention.

What I claim as new and desire to secure by Letters Patent of the United States is:

1. Means for stabilizing the output of a dynamoelectric machine having a magnetic core at a constant value comprising an excitation winding for producing a magnetic flux in said core, a regulator for controlling the current in said excitation winding, and means for sensing directly the instantaneous flux variations in said core connected to said regulator to modify the excitation current to stabilize the output for said machine.

2. Apparatus for controlling the output of a dynamoelectric machine having a magnetic core comprising an exciting winding to produce the excitation flux in said core, a regulator for controlling the level of the excitation flux produced by said winding, and a coil independent of the current in the exciting winding magnetically coupled to said core for sensing the instantaneous rate of change of flux therein, said coil being operably connected to said regulator to modify the level of excitation flux in said magnetic core to maintain the output of said machine at a constant value.

3. In a dynamoelectric machine, a magnetic core, a winding providing flux excitation for said core, and a collar insulatingly protecting said winding from ground, said collar including a flux sensing coil for providing a voltage at its output terminals directly responsive to the instantaneous rate of change of flux in the core.

4. A motor-generator set comprising a D. C. drive motor having a magnetic core and an excitation winding for producing flux in said core, an A. C. alternator driven by said motor, a regulator for controlling the level of excitation flux produced by said excitation winding, and a coil independent of the current in the excitation winding magnetically coupled to said core for sensing the instantaneous rate of change of flux therein, said coil being operably connected to the regulator to modify the level of excitation flux in said magnetic core to maintain the output frequency of said alternator within closely defined limits.

5. A motor-generator set as defined in claim 4, wherein the regulator comprises a tuned circuit for producing a correcting signal of high amplification in response to deviations from the frequency output of said alternator.

6. A D. C. drive motor having a magnetic core and an excitation winding for producing flux in said core, a regulator for controlling the level of excitation flux produced by said excitation winding, and a coil independent of the current in the excitation winding magnetically coupled to said core for sensing the instantaneous rate of change of flux therein, said coil being operably connected to the regulator to modify the level of excitation flux in said magnetic core to maintain the speed of said motor within closely defined limits.

7. A dynamoelectric machine having a magnetic frame, a removable salient pole, means for securing said pole to said frame, a winding arranged for producing excitation flux in said pole, and an insulating collar for protecting said winding from discharge to ground, a flux sensing coil independent of the current in said excitation winding embedded in said collar and magnetically coupled to said pole to sense directly the instantaneous rate of change of flux in said pole to provide electromagnetic force at its terminals directly responsive to the instantaneous rate of change of flux in said pole.

References Cited in the file of this patent

UNITED STATES PATENTS

| | | |
|---|---|---|
| 961,805 | Scott | June 21, 1910 |
| 1,781,776 | Capps | Nov. 18, 1930 |
| 1,933,858 | Keller | Nov. 7, 1933 |
| 2,328,470 | Lange et al. | Aug. 31, 1943 |
| 2,381,245 | Askey | Aug. 7, 1945 |
| 2,453,341 | Rady | Nov. 9, 1948 |
| 2,511,174 | Osborne | June 13, 1950 |
| 2,640,100 | Packer et al. | May 26, 1953 |
| 2,744,204 | McGuiness | May 1, 1956 |